United States Patent [19]

Moon

[11] Patent Number: 4,529,325

[45] Date of Patent: Jul. 16, 1985

[54] TECHNIQUE FOR COMPENSATION FOR BANDWIDTH LIMITATIONS OF MICROPROCESSOR UTILIZED FOR SERIAL PRINTER CONTROL

[75] Inventor: Suhdok D. Moon, Los Altos, Calif.

[73] Assignee: Oume Corporation, San Jose, Calif.

[21] Appl. No.: 382,107

[22] Filed: May 26, 1982

[51] Int. Cl.³ ............................................. B41J 5/30
[52] U.S. Cl. .................................... 400/70; 400/144.2; 400/320; 400/705; 400/901; 318/594; 318/601
[58] Field of Search ..................... 400/70, 144, 144.1, 400/144.2, 144.3, 154.3, 154.4, 155, 162.2, 162.3, 163.1, 320, 322, 705, 901; 307/269, 271; 318/590, 592, 594, 600, 601, 607, 616, 617, 619

[56] References Cited

U.S. PATENT DOCUMENTS

| | | | |
|---|---|---|---|
| 3,973,662 | 8/1976 | Fulton | 400/320 X |
| 4,118,129 | 10/1978 | Grundherr | 400/320 X |
| 4,146,922 | 3/1979 | Brown et al. | 400/320 X |
| 4,219,766 | 8/1980 | Lin | 318/592 X |
| 4,315,198 | 2/1982 | Lin et al. | 318/594 |
| 4,340,848 | 7/1982 | Hanagata et al. | 318/601 X |
| 4,349,770 | 9/1982 | Ragen | 318/594 X |

Primary Examiner—Ernest T. Wright, Jr.
Attorney, Agent, or Firm—T. L. Peterson; J. M. May

[57] ABSTRACT

To enable a microprocessor to operate within its bandwidth limitations while controlling a serial printer, means are provided for adjusting the microprocessor system clock rate when the printer is in its rate mode. In particular, the output of a counter clocked by the pulses from an encoder representing the velocity of a member is controlled; the output of the counter being selectively applied to the microprocessor in accordance with the velocity of the member being controlled.

5 Claims, 8 Drawing Figures

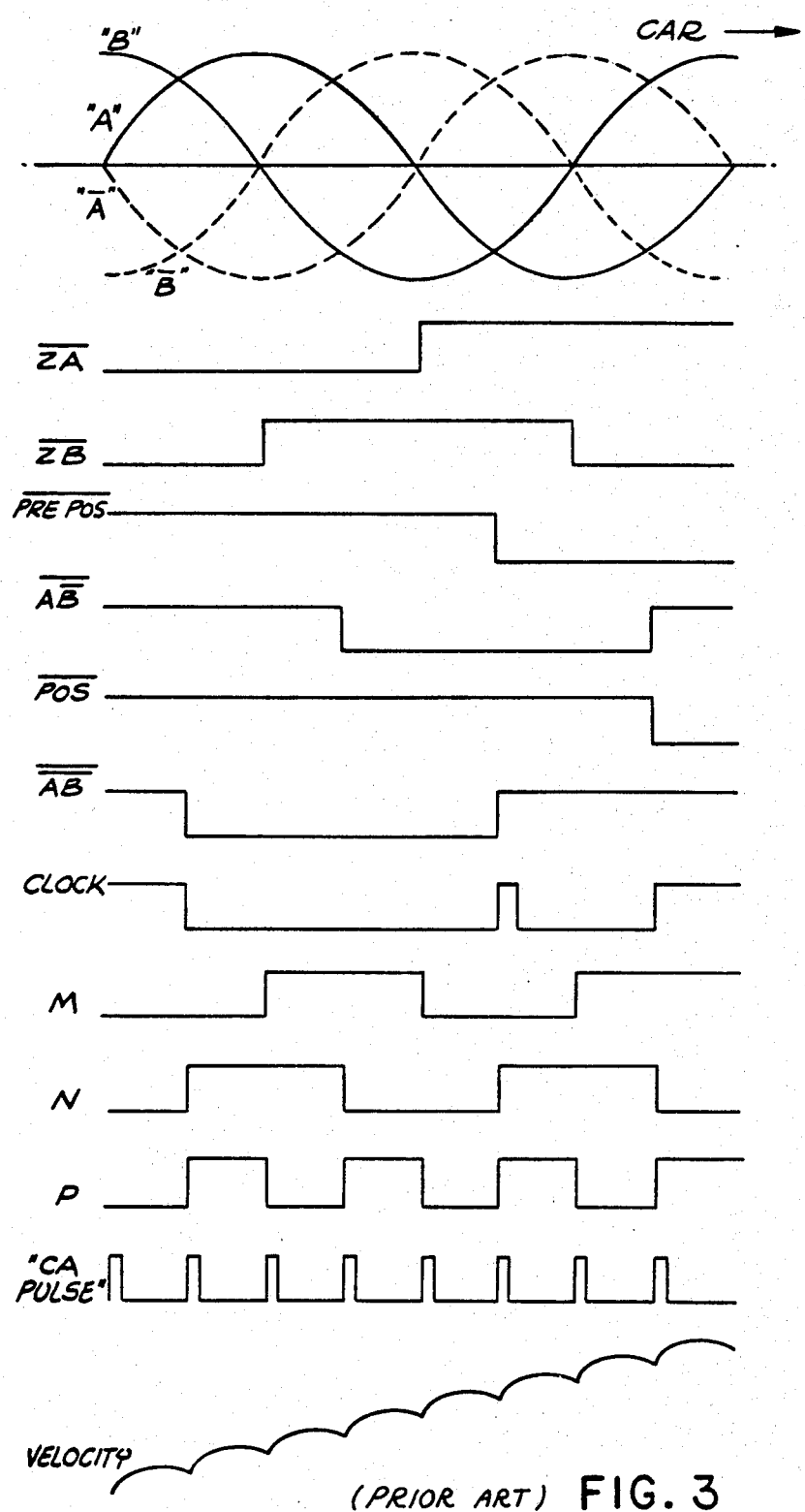
(PRIOR ART) FIG. 3

TECHNIQUE FOR COMPENSATION FOR BANDWIDTH LIMITATIONS OF MICROPROCESSOR UTILIZED FOR SERIAL PRINTER CONTROL

BACKGROUND OF THE INVENTION

Serial printing systems are known in which a rotary print wheel is mounted on a carriage for translation across the width of the print area during printing. The carriage is typically translated from left to right through a series of cables and pulleys driven incrementally by a D.C. motor controlled by a suitable electronic control system. As the carriage is translated from print position to print position along a line, the print wheel is rotated so that the character pad bearing the next character to be printed is aligned with the striking end of a print hammer, also mounted on the carriage, when the carriage is momentarily stopped. When the carriage stops, the print hammer is actuated to impress the character borne by the pad against an inking ribbon and the face of the printing media to print that character. After the print hammer rebounds, the carriage is translated to the next print position, the print wheel is rotated so that the proper character pad is aligned with the print hammer, and the next character is printed. This process continues until a complete line has been so printed, after which the carriage is returned to the starting position in preparation for printing the next line of characters.

Proper operation of such printing systems depends on a number of factors. Firstly, accurate positioning mechanisms must be employed for both the carriage translation mechanism and the print wheel rotating mechanism to insure that the characters are printed at exactly the right location with the proper orientation.

Another factor affecting performance of such printing systems is the manner in which the print hammer is operated during the actual printing of a character.

U.S. Pat. No. 4,118,129 describes a serial printing system including print wheel and carriage servo motors to achieve extremely flexible and precise print wheel and carriage positioning at high speeds. The system also provides a variable print hammer striking force capable of being adjusted over a wide range of magnitudes. The print wheel and carriage servo motors are each provided with an opto-electronic position sensing circuit for generating precise position control signals for the associated electronic control system.

The electronic control system of said U.S. Pat. No. 4,118,129 includes a character register for storing data representative of a character to be printed supplied from an associated source; a memory device for storing both character selection information and also hammer intensity information associated with the individual characters on the print wheel; a print wheel position counter for generating signals indicative of the instantaneous angular position of the print wheel; an arithmetic unit for generating signals representative of the angular position of the desired character on the print wheel relative to the character printing position, and the initial optimum direction of rotation of the wheel; a carriage position counter for indicating the instantaneous position of the print wheel character relative to the next character print position along a line; and a timing and control unit responsive to the signals generated by the aforementioned units for generating control signals for a hammer drive unit, a print wheel drive unit and a carriage drive unit, as well as timing signals for clocking the print wheel and carriage position counters and a "Select" signal for specifying read out of the character selection or the hammer intensity information from the memory.

The print wheel drive unit and the carriage drive unit each comprise a servo control system operable in both a position, or detent, mode and a rate mode, the former being employed when the print wheel or the carriage is statically positioned for printing, the latter being employed during motion of the print wheel or the carriage.

In the rate mode, position reference signals from the associated position sensing circuit are processed to provide a plurality of sequentially sampled reference signals indicating instantaneous velocity of the movable member while the position signals from the position counter are converted into a correction signal representative of a predetermined ideal motor velocity. The instantaneous velocity signals and the ideal velocity signals are combined to provide an optimum error correction voltage.

The serial printer described in the aforementioned patent relied upon hard-wired control logic to implement the many control functions and operations required. An improved version of that printer wherein a microprocessor is utilized in place of portions of hard-wired control logic for powerful flexibility is the Sprint 5 daisywheel printer, manufactured by Qume Corporation, San Jose, Calif.

U.S. Pat. No. 4,315,198 discloses a digital servo system useful in serial printers for accurately positioning a movable member such as a rotary print wheel or carriage. Although the technique disclosed in this patent improves upon prior art linear servo control systems for controlling the movement of a print wheel and/or carriage by utilizing digital circuit techniques, the problem of minimizing the limitations imposed upon the overall system by the microprocessor bandwidth was not addressed. "Bandwidth" used in association with a microprocessor typically refers to the throughput capacity of the processor and depends both upon the microprocessor's processing speed (i.e., the number of instructions that may be executed by the microprocessor per unit of time) and also upon the amount of data that may be processed in parallel (i.e., the number of bits which a single microprocessor instruction can manipulate as a single word of data.)

SUMMARY OF THE PRESENT INVENTION

The present invention is directed to a printer including a microprocessor for controlling the velocity of a movable member used therein; e.g., the carriage. The bandwidth limitations of the microprocessor are minimized by tracking the velocity profile and controlling the output of a counter clocked by the pulses from an encoder representing the velocity of the member to be controlled; the output from the counter being applied to the microprocessor selectively dependent upon the velocity of the member being controlled.

BRIEF DESCRIPTION OF THE DRAWING

For a better understanding of the invention as well as other objects and further features thereof, reference is made to the following description which is to be read in conjunction with the drawing wherein:

FIG. 3 is a timing diagram for the system shown in FIG. 2;

DESCRIPTION OF THE PREFERRED EMBODIMENT

Figure 1:
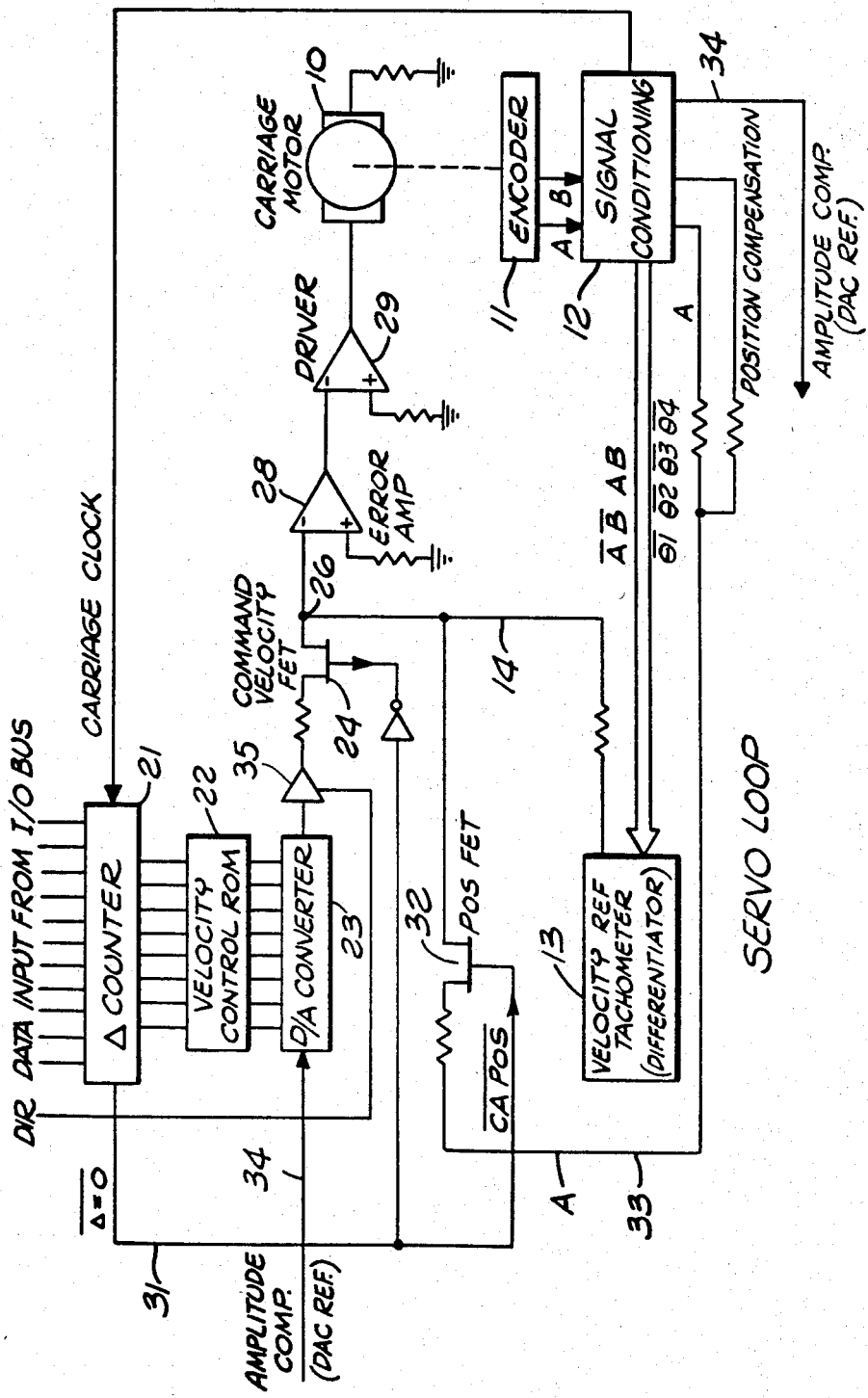
FIG. 1 is a block diagram of a prior art closed loop linear servo system.
Figure 2:
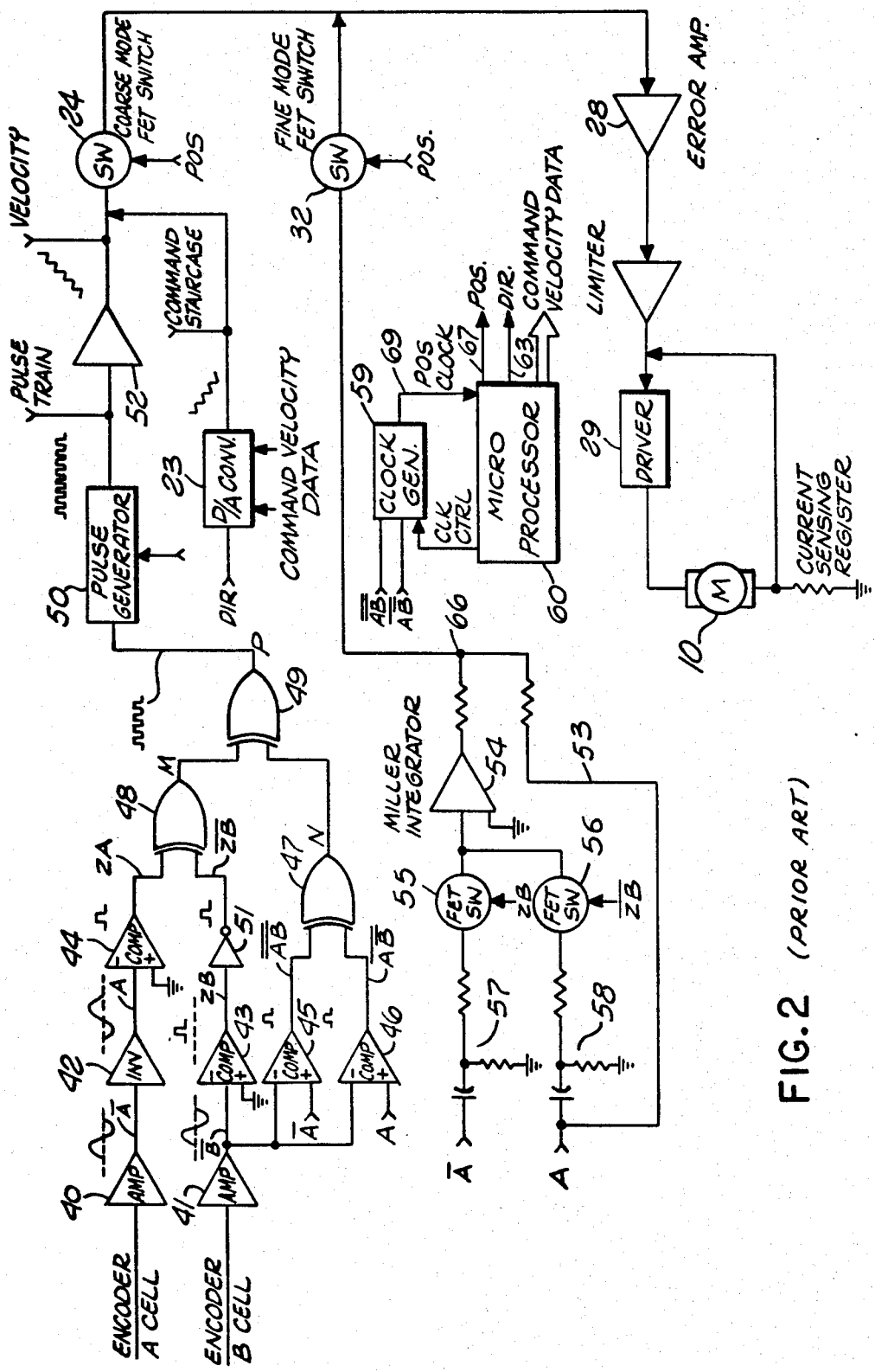
FIG. 2 is a partial block diagram, partial schematic diagram of a prior art closed loop digital servo system.

FIGS. 1, 2, and 3 herein correspond to FIGS. 1, 2, and 4, respectively, of aforementioned U.S. Pat. No. 4,315,198. FIG. 1 illustrates the control of the carriage motor 10 for a serial, or rotary wheel, printing system; however, as disclosed in said U.S. Pat. No. 4,315,198, this servo system can also be used to control positioning of a rotary daisywheel. An analog encoder 11, which is mechanically coupled to motor 10, generates a pair of phase spaced signals A and B, representing carriage position (note that a digital encoder may also be utilized). Signals A and B may be, for example, a pair of sinewaves spaced ninety degrees apart in phase, such as illustrated in FIG. 3. Signals A and B are conditioned in a signal conditioning unit 12 which, for example, may be a group of operational amplifiers, to provide inverted signals $\overline{A}$ and $\overline{B}$ and associated timing signals $\theta1$, $\theta2$, $\theta3$ and $\theta4$ based on peak and zero crossing times of signals A and B. These signals are connected to a velocity reference tachometer 13 which differentiates the input signals A, B, $\overline{A}$ and $\overline{B}$ in accordance with the timing signals $\theta1$, $\theta2$, $\theta3$ and $\theta4$ to provide a velocity reference signal on line 14 that represents the actual velocity of carriage motor 10. Unit 12 also provides a clock signal for decrementing delta counter 21.

The prior art servo system of FIG. 1 is known as a dual mode servo having rate and detent modes of operation. In the rate mode, the actual carriage velocity, represented by a signal on line 14 from the velocity reference tachometer 13, is compared with a command velocity, represented by a signal on the I/O bus supplied by an external device such as a microprocessor 60 (FIG. 2). The command velocity (represented by an analog signal produced by converter 23 and with polarity switched by operational amplifier 35 in accordance with the state of digital control signal DIR) is supplied via FET 24 enabled during the rate mode, to error amplifier 28. Error amplifier 28 seeks to make the actual velocity of the motor 10 follow the command velocity. During the detent mode, the control signal $\Delta=0$ on line 31 goes high, the command velocity FET 24 is disabled and the signal A on line 33, representing the actual position of the motor 10, is applied through position FET 32, enabled during the detent mode to error amplifier 28 along with the output on line 14 of velocity reference tachometer 13. The error amplifier 28 then seeks to position the motor 10 such that signal A is at a zero crossing point, in effect, an electronic detent. A delta ($\Delta$) counter 21 which controls how far the servo system moves the carriage motor 10 (and thus the carriage 99 coupled thereto) is initialized by a data input applied thereto from the I/O bus. Encoder 11 outputs one sinusoidal signal cycle for each unit increment of movement by the carriage motor 10. Delta counter 21 is decremented by one for each such signal cycle and thus at any given time indicates the number of increments of movement remaining for the carriage 99 to reach its commanded position. When delta counter 21 reaches zero, it forces line 31 low thus turning on FET 32 and turning off FET 24, thereby switching the servo from its rate to its detent mode of operation.

When in the rate mode, delta counter 21 serves the purpose of generating the command velocity as a function of the distance to be moved at any given time. This function, or profile, is stored in the velocity control Read Only Memory (ROM) 22 which outputs a digital signal which is converted to analog by D/A converter 23 and then coupled to FET 24 via amplifier 35.

In the rate mode of operation, the actual velocity of the carriage motor 10 (via line 14) is compared to the command velocity (via FET 24). Upon reaching the commanded position, the servo system shifts to the detent mode of operation where it locks on the zero crossing point of the A signal to precisely position the carriage motor 10. The actual velocity feedback signal is preferably continued during the detent position mode for better stability. The output of the error amplifier 28 is provided to a driver amplifier 29 which drives the carriage motor 10.

An amplitude compensation signal on line 34 is produced by the signal conditioning unit 12. This signal is connected to the D/A converter 23 to compensate for amplitude and phase change in the A and B encoder 11 signals. This amplitude compensation requires analog circuitry (analogous to that shown in FIG. 7 at reference numerals 59, 68, 69, 70 and 71 of said U.S. Pat. No. 4,118,129), which, in essence, detects the peak amplitudes of the various A, B, $\overline{A}$, $\overline{B}$ encoder reference signals of the servo system. Note that line 34 is not necessary if encoder 11 is digital since a digital signal would be provided by signal conditioning circuit 12.

FIG. 2 shows an improved version of the system shown in FIG. 1 and depicts a block diagram of a closed loop digital servo system employing the invention disclosed in the aforementioned U.S. Pat. No. 4,315,198. Common elements in both figures are represented by the same reference numbers. The signals from the position encoder 11 (not shown in FIG. 2) are amplified and inverted in operational amplifiers 40 and 41 to produce $\overline{A}$ and $\overline{B}$ signals. The $\overline{A}$ signal is inverted by an inverting operational amplifier 42 to produce the A signal. The A and $\overline{B}$ signals are compared with ground potential in comparators 43 and 44, a digital output signal being generated whenever the input is negative. These digital signals are referred to as ZA and ZB, respectively. The ZB signal is inverted by inverter 51 to produce $\overline{ZB}$.

Figure 4A:
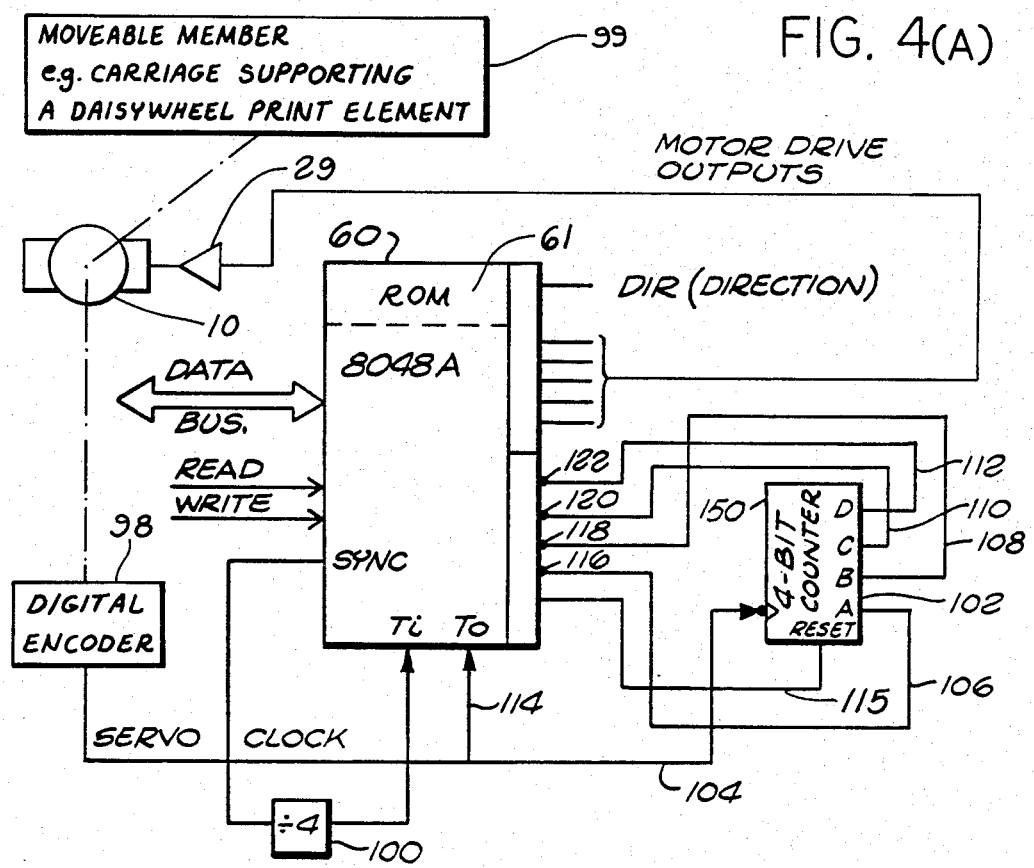
FIG. 4(a) is a block diagram of the present invention.

Referring to FIG. 3, the timing diagram shows a single cycle (i.e., 360°) of the A and B position signals produced by the digital servo during a unit of incremental movement of the controlled moveable member 99 (FIG. 4(a)), e.g., a print wheel or a carriage 99 driven by motor 10. Signal B leads signal A by 90 degrees, signal A leads signal $\overline{B}$ by 90 degrees and, signal $\overline{B}$ leads signal $\overline{A}$ by 90 degrees. The $\overline{ZA}$ and $\overline{ZB}$ digital signals go high when their corresponding sinusoidal position signals go negative.

Returning to FIG. 2, the $\overline{B}$ signal is compared with the $\overline{A}$ signal in a comparator 45 and with the A signal in a comparator 46. Comparators 45 and 46 go high when the $\overline{B}$ signal is negative compared to the respective A or $\overline{A}$ signal. The outputs of comparators 45 and 46 are applied to an exclusive OR gate 47. The output of exclusive OR gate 47, signal N, and the outputs of comparators 45 and 46, signals $\overline{AB}$ and $\overline{\overline{AB}}$, are depicted in FIG. 3.

The output of comparator 43 is applied via inverter 51 to an input of exclusive OR gate 48 along with the output of comparator 44. The output of exclusive OR gate 48, signal M, is also shown at FIG. 3. It should be noted that the M and N signals from exclusive OR gates 48 and 47, respectively, change state four times during each 360 degrees phase change in the analog position signal. It should be noted that the M signal changes state at each zero crossing of either of the A or B analog position signals while the N signal changes state as the A, B, $\overline{A}$ and $\overline{B}$ signals cross each other off axis.

The M and N signals are applied to another exclusive OR gate 49, which produces a P signal shown at FIG. 3. The P signal changes state eight times during the 360 degrees phase change in the analog position signal and therefore more accurately represents the changing position of the movable object controlled by the servo system than either the M or N signals would do individually. The P signal is preferably applied to a constant amplitude and pulse width pulse generator 50 for producing a relatively narrow pulse in response to each polarity change occurring in the P signal. Since the P signal changes state eight times for a 360 degree phase change in the analog position signal, the output of generator 50 provides a pulse train of eight pulses for such change in the analog position signal. The pulse train has individual pulses of uniform height and duration with leading edges occurring in time with each relative 45 degrees of phase change in the analog position signal. The output of generator 50, which represents actual velocity, is applied via a Miller integrator 52 and FET electronic switch 24 to error amplifier 28. Also applied to error amplifier 28 via FET switch 24 is a command velocity from D to A converter 23. Switch 24 is closed when in the rate mode of operation and opened in the detent mode of operation as set forth hereinabove.

In the detent mode of operation, a switch 32 is closed which couples the A position signal via line 53 to error amplifier 28 as well as a velocity signal from integrator 54 whose output connected to line 53 at junction 66. Integrator 54 is responsive to the A and $\overline{A}$ signals coupled via RC circuits 57 and 58, respectively, to FET electronic switches 55 and 56, respectively. Electronic switches 55 and 56 are controlled by the ZB and $\overline{ZB}$ signals from comparator 43 and inverter 51, respectively.

Also shown in FIG. 2 is a microprocessor 60 which is appropriately programmed to supply command velocity data to D to A converter 23. Thus, microprocessor 60 performs the functions attributed to the delta counter 21 and velocity control ROM 22 of FIG. 1 by maintaining the delta count and looking up the command velocity based on the delta count. The command velocity profile is preferably stored in a ROM (such as shown at reference numeral 61 of FIG. 4(a)) associated with microprocessor 60. Microprocessor 60 also outputs the position signal POS (i.e., $\Delta = 0$) on line 67 for controlling switches 24 and 32 as well as a direction signal DIR indicative of the direction which the controlled object is to move. A clock generator 59 generates a position clock signal on line 69 for decrementing the delta count maintained in microprocessor 60. Clock generator 59 is arranged to count on either $\overline{AB}$ or $\overline{\overline{AB}}$ signals according to the direction of movement and mode of operation.

For the direction of movement shown in FIG. 3, microprocessor 60 generates a $\overline{PRE}\ \overline{POS}$ signal at the next to last count (but during the final 360 degrees of analog position signal phase change to the commanded at rest position). The microprocessor 60 then tests for the occurrence of $\overline{AB}$ and thereupon decrements the delta count to zero and generates $\overline{POS}$. The timing relationship between $\overline{AB}$, $\overline{\overline{AB}}$, $\overline{POS}$ and $\overline{PRE}\ \overline{POS}$ are shown in FIG. 3 for one direction of movement during the last incremental amount of movement. If the movable member were moving in the other direction, the delta count would initially be decremented on AB and finally decremented to zero on $\overline{AB}$ when $\overline{PRE}\ \overline{POS}$ went low. For this reason, the clock generator 59 is responsive to directional information on lead 63 to control which signal $\overline{AB}$ or $\overline{\overline{AB}}$ is used to initially decrement the delta counter and is responsive to $\overline{PRE}\ \overline{POS}$ to finally decrement the delta counter to zero on the signal $\overline{AB}$ or $\overline{\overline{AB}}$ not used initially. Whereas the embodiment of FIG. 1 uses a separate delta counter 21, the microprocessor embodiment of FIG. 2 stores the delta count within microprocessor 60. The creation of two clock cycles during the final incremental amount of movement permits smoother generation of the command velocity by microprocessor 60 during the critical state of movement just prior to entering the detent mode of operation when the servo electronically detents on the zero crossing of the A signal.

The details of the logic circuitry used in the block diagram of FIG. 2 are set forth in the aforementioned U.S. Pat. No. 4,315,198, the teachings of which, necessary for an understanding of the present invention, being incorporated herein by reference.

FIG. 4(a) is a block diagram illustrating the principles of the present invention. In essence, the hybrid linear-digital system shown in FIG. 2 is modified as follows: (1) A digital encoder 98 is utilized in lieu of linear encoder 11 to directly provide digital pulses having a rate proportional to the velocity of the movable member 99; and (2) the input pulses supplied to microprocessor 60 (typically an Intel microprocessor model 8048), representative of the motion of a movable member 99 are modified in a predetermined manner. Based on these input pulses, microprocessor 60 logically keeps track of how many increments the carriage 99 has travelled and the velocity thereof. If the carriage 99 is traveling fast and thus generating pulses at a high rate, a first submultiple (e.g., $\div 4$) of the pulses are supplied to microprocessor 60. In the carriage slow-down area (detent approach), a second different submultiple (e.g., $\div 2$) of pulses are utilized by the microprocessor 60 to provide for smooth control.

For the velocity determination in accordance with the teachings of the present invention, the clock interval is measured by microprocessor 60. If an 8048/41 (manufactured by Intel Corporation, Santa Clara, Calif.) is utilized, its "timer mode" output provides a 80 $\mu$second clock period which is considered too coarse at high speeds. However, if the "Event Counter Mode" output is utilized, the resolution can be as low as 7.5 $\mu$second. For a carriage speed of 40 inches per second, the event count number for a whole increment interval will be 26, which is adequate. The event count mode clock is derived from the SYNC output of microprocessor 60, divided by counter 100, to provide a 100 KHz clock which in turn provides a pulse every 10 microseconds at input $T_i$ for use by microprocessor 60 in its Event Counter mode.

The SERVO CLOCK signal derived from the output of the digital encoder 98 is applied to the $T_o$ input via line 114 and to the input of a four-bit counter 102 via line 104. As set forth hereabove, microprocessor 60 in the normal mode of operation has its own internal clock of a predetermined rate at its SYNC output. Either the SERVO CLOCK signal (line 114), or a fraction or submultiple of the SERVO CLOCK signal determined by the output of counter 102 (lines 116, 118, 120, 122), provides a window on the microprocessor 60 output pulses of the above-described 10 μsec interval clock at input $T_i$ using the Event Counter mode of microprocessor 60. A software routine executed by the microprocessor 60 selects which window is operative depending upon whether the carriage 99 (or other controlled movable member) is in the rate mode or approaching detent.

Figure 5A:
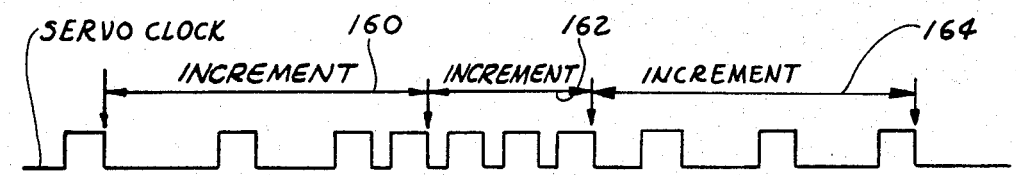
FIGS. 5(a) and 5(b) illustrate the principles of the present invention.

FIG. 5(a) schematically depicts the output from the digital encoder 98 representative of carriage motion. In an initial interval or increment 160, the spacing between the pulses decreases as the carriage 99 is brought up to speed. In a later interval 162, after the carriage 99 reaches a uniform velocity, the pulse spacing is constant. In a subsequent interval 164, the pulse spacing increases as the carriage speed is reduced.

Figure 5B:
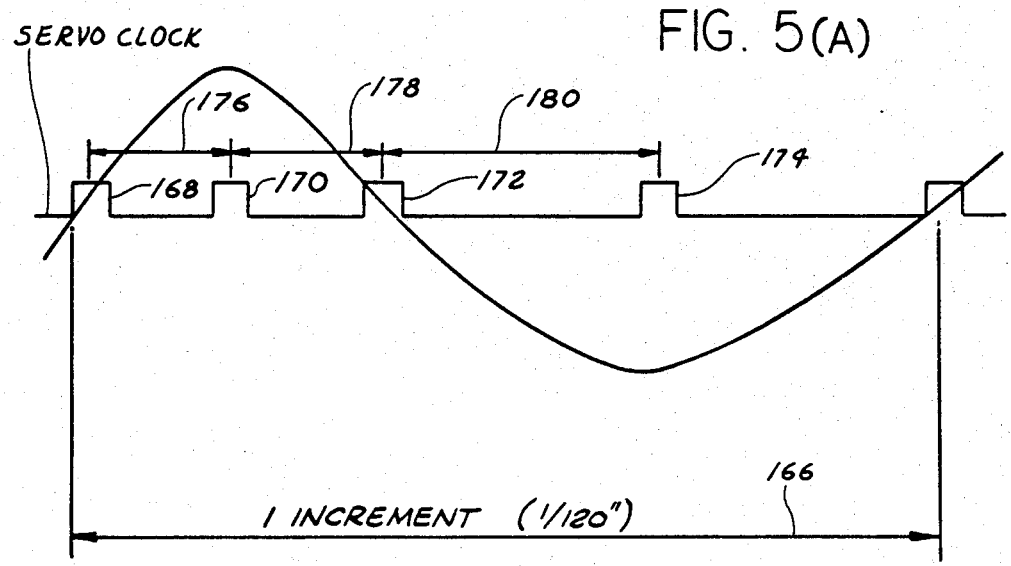

FIG. 5(b) illustrates a typical carriage increment 166 (1/120 inch) for one linear encoder cycle and the four pulses (168, 170, 172, 174) generated by the encoder 98 during the increment 166. The increment 166 illustrated shows the four pulses generated in a non-uniform time spacing (176, 178, 180) during the slow-down portion of the increment 166.

In the digital servo system of the present invention, greatest resolution is required during the slow-down periods of the increment. In other words, the velocity profile stored in ROM 61 within the microprocessor 60 must be accessed at a faster rate relative to the encoder pulse rate as the latter slows down.

Figure 4B:
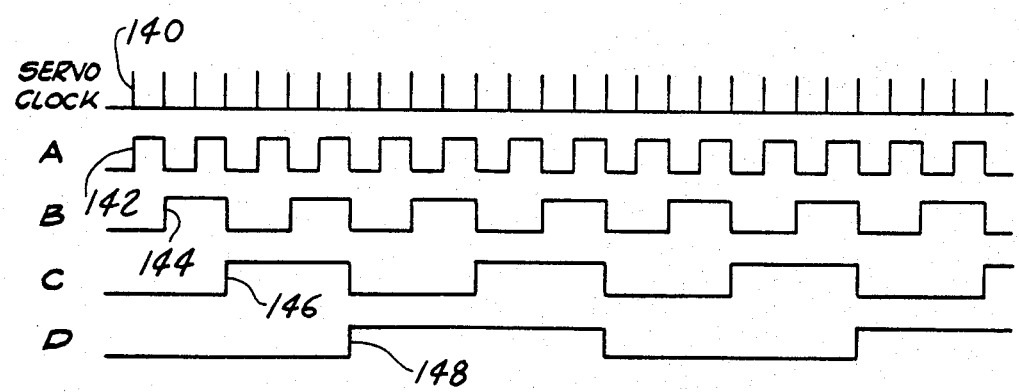
FIG. 4(b) is a timing diagram for FIG. 4(a)

In accordance with the teachings of the present invention, counter 102, clocked by the signal SERVO CLOCK (FIG. 4(b)) on lead 104 (FIG. 4a), provides a series of output pulse trains A, B, C and D, each corresponding to a different fraction or submultiple of the SERVO CLOCK pulse rate as shown in FIG. 4(b). For example, the pulse rate of the A pulse train pulses ½ the SERVO CLOCK pulse rate; that of the B pulse train pulses is ¼ the SERVO CLOCK pulse rate; that of the C pulse train pulses is ⅛ the SERVO CLOCK pulse rate and that of the D pulse train pulses is 1/16 the SERVO CLOCK pulse rate. These respective train output pulses are applied to microprocessor 60 via leads 106, 108, 110 and 112, respectively, whereas the SERVO CLOCK signal is also applied directly to microprocessor 60 via lead 114.

As set forth hereinabove, divider 100 divides the SYNC output by four and applies it to microprocessor 60 via terminal $T_i$ as the Event Counter 10 μsecond firing signals.

The arrangement shown in FIG. 4(a) provides two basic functions, namely: (1) reducing the effective encoder pulse input rate such that the new system Event Counter Clock signal is within the bandwidth of microprocessor 60 and (2) determines whether the SERVO CLOCK signal on lead 106 or one of the signals (A, B, C, or D) on leads 108 . . . 112 provides the Event Counter window on the 10 μsecond firing signals such that a higher signal rate is utilized when the carriage 99 is approaching detent at a slow speed and a slower signal rate is utilized when the carriage 99 is operating at a high speed in the rate mode.

Microprocessor 60 executes a software routine depicted in FIG. 6(b) which relates the ideal incremental velocity profile for the carriage 99 to the number of encoder pulses received. The normal rate of eight encoder pulses per unit increment of carriage movement is adjusted as set forth hereinabove.

Four-bit counter 102 is initially reset by a signal on lead 115 from microprocessor 60, the counter 102 then is reconditioned to count pulses applied to its input. The SERVO CLOCk signal (output from the digital encoder) is applied to an input counter 102 via lead 104. The counter outputs at terminals A, B, C and D correspond to the SERVO CLOCK divided (for a predetermined interval) by ½, ¼, ⅛ and 1/16 and are respectively applied to corresponding inputs 116, 118, 120 and 122 of microprocessor 60.

In accordance with the teachings of the present invention, instead of using the servo clock pulses directly, a selected output of counter 102 is used by the microprocessor 60 to enable the microprocessor 60 to operate within its bandwidth limitations. In particular, the SERVO CLOCK pulses derived from the digital encoder 98 are divided by a first factor, preferably eight, when the controlled movable members (print wheel and/or carriage 99) are far, relatively, from their destination positions (the control system therefor being commanded to operate at a greater velocity), and then by four and subsequently by two when the movable member 99 is close to the detent, or desired, position. In a preferred embodiment, microprocessor 60 monitors carriage velocity along the velocity profile therein and selects the desired output of counter 102. By selecting one of the four outputs the SERVO CLOCK signal is effectively divided by ½, ¼, ⅛ or 1/16. At the highest carriage speed, microprocessor 60 selects the counter output such that one clock pulse per increment (⅛) is generated. As the speed of the movable member 99 slows down, the counter control is switched to ¼ and then to ½. Near the detent point, where the pulse repetition rate is slow, it changes to full resolution (all eight clock pulses per increment are utilized) by selecting the undivided SERVO CLOCK signal applied to input $T_o$ of microprocessor 60.

Figure 6A:
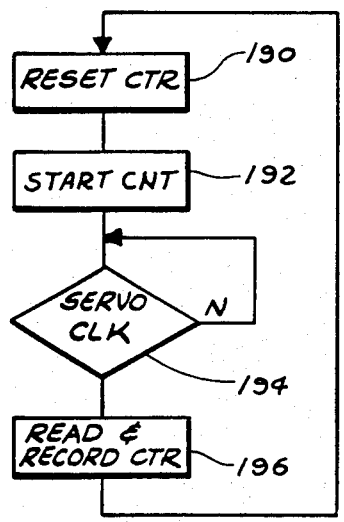
FIGS. 6(a) and 6(b) are flow charts illustrating the operation of the embodiment of FIGS. 4(a) and 4(b).
Figure 6:
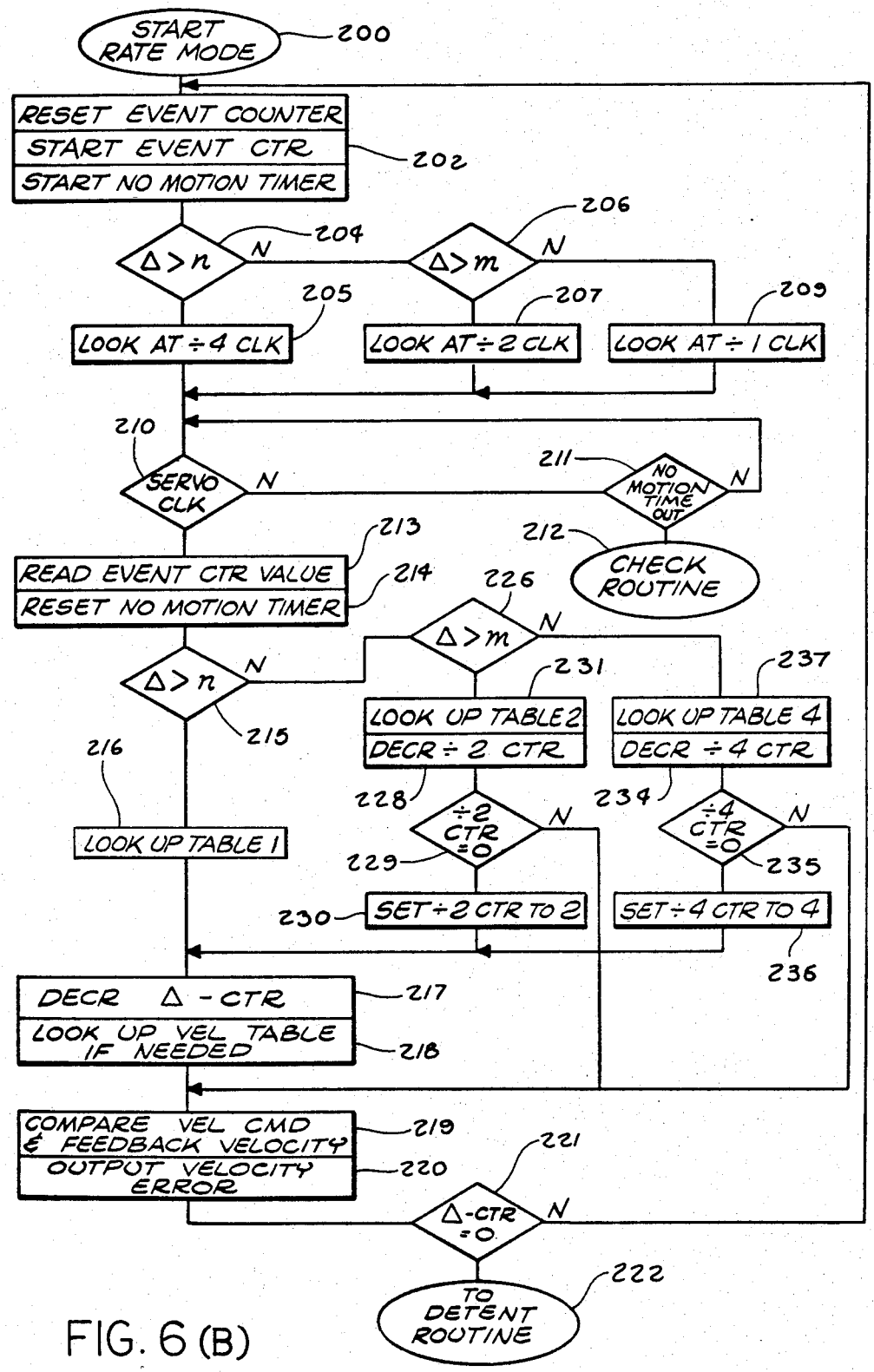

FIG. 6(a) is a simplified flow chart for measuring the duration between successive servo clock pulses, the results of which are utilized in the FIG. 6(b) flow chart. Initially, the Event Counter of microprocessor 60 is reset (block 190) and then started (block 192). When the next relevant servo clock pulse is input to the microprocessor (block 194), the contents of the Event Counter are read and recorded (block 196). Event Counter is then reset and started over (blocks 190, 196) to determine the duration of the period between the next two servo clock pulses.

FIG. 6(b) is a flow chart depicting the rate mode software routine useful to explain the operation of the apparatus of FIG. 4(a). Prior to considering FIG. 6(b) in detail, it would be well to recall that a unit increment of movement of the movable member 99, (e.g., a carriage), is typically on the order of 1/120 of an inch and that a typical digital encoder 98 will generate eight pulses per unit increment. Thus, each encoder pulse typically represents about 1/960 of an inch movement. In order to determine the velocity of the movable member 99, the time duration between each successive pair of encoder pulses can be measured by the aforementioned microprocessor Event Counter counting the aforementioned ten microsecond timing pulses. However, because of the microprocessor bandwidth limitations, it is not feasible for the microprocessor 60 to measure the duration between every successive pair of encoder pulses over the entire velocity range of the movable member 99 and utilize each individual such measurement to generate a corresponding velocity correction command. It is essential that a relatively high frequency clock rate (e.g., 100 KHz) be used to drive the Event Counter in order to be able to precisely track the member 99 when it is moving very slowly. When the member 99 is moving at its maximum velocity, less precision is required; however, the encoder pulses will be generated at a rate faster than can be properly processed by the microprocessor 60. It is this bandwidth problem which the present invention is intended to solve.

The solution resides in reducing the number of encoder SERVO CLOCK pulses to be processed by the microprocessor 60 at higher carriage speeds. This action is taken by using a selected submultiple of the pulses as speed is increased; e.g., dividing the SERVO CLOCK pulses by 2, 4, or 8 as speed increases. For simplicity, FIG. 6(b) assumes that only four encoder pulses are generated per unit increment of movement and that division by only 2 or 4 (or the undivided SERVO CLOCK signal) is used. FIG. 6(b) also assumes that m and n represent incremental position break points (which may correspond to different command velocities) above which different submultiples are used, respectively.

Recall from FIG. 1 that the $\Delta$ counter 21 is used to store a number ($\Delta$) defining the number of unit increments of movement through which the carriage 99 must pass to reach its destination. Recall also that as the carriage 99 moves through each unit increment, the $\Delta$ count in counter 21 is decremented by one and when the $\Delta$ count equals zero, the system switches to a detent routine to retain the carriage 99 at that position. In the microprocessor embodiment of the present invention, an equivalent $\Delta$ count is maintained by the microprocessor 60 and decremented appropriately so that when the $\Delta$ count reaches 0, it is known that the carriage 99 has arrived at its destination and that the system should switch to its detent routine.

The flow chart, as depicted in FIG. 6(b), describes the operational cycle executed by the microprocessor 60 for each servo clock pulse supplied to it at terminal $T_o$ or, at higher speeds, from counter 102. As the rate mode routine cycle starts (block 200), the Event Counter mode of microprocessor 60 is reset and then started (block 202). A "no motion" timer subroutine (block 211) is also started. Depending upon the current incremental position $\Delta$ of the movable member 99, the SERVO CLOCK pulse train pulses from encoder 98 may be utilized directly or may be divided by counter 102 either by 4 or 2 prior to being utilized as the servo clock input by microprocessor 60. Thus, as depicted in FIG. 6(b), if $\Delta$ exceeds n, then the microprocessor 60 looks at the divide by four output (pulse train B of FIG. 4(b)) of counter 102 (blocks 204, 205). If $\Delta$ exceeds m but is less than n, then the microprocessor 60 looks at the divide by two output (pulse train A) of counter 102 (blocks 206, 207). If $\Delta$ is less than n, then the microprocessor 60 uses the encoder pulses (the SERVO CLOCK pulse train) directly (block 209).

The decision block labeled "servo clk" 210 in FIG. 6(b) (block 210) monitors the relevant train of servo clock pulses (SERVO CLOCK, A, or B of FIG. 4(b)) applied to microprocessor 60. If the "no motion" timer routine (block 211) times out before the end of a servo clock period is detected (block 210), the system jumps to a diagnostic "check" routine (block 212). If on the other hand, the end (e.g. the next leading edge (140, 142, 144, 146, 148) of the relevant pulse train (SERVO CLOCK, A, B, C, or D, respectively) of a servo clock period is detected (block 210), then the Event Counter value is read (block 213) and the "no motion" timer routine (block 211) is re-set (block 214).

If the current value of $\Delta$ is greater than n (during which the microprocessor 60 was looking at a divide by four submultiple (pulse train B of FIG. 4(b)) from the encoder 98), this means that the movable member 99 has moved through one full unit increment. Thus, the $\Delta$ count is decremented (block 217) and the Event Counter value can be used to determine actual velocity from a first look-up table (block 216). The desired velocity corresponding to $\Delta$ is similarly determined from a velocity command look-up table (block 218) and is then compared with the actual or feedback velocity (block 219) and a Velocity Error signal, as has been discussed in connection with FIGS. 1 and 2, is generated (block 220) to modify the actual velocity to conform to the command velocity determined from the table. Flow then proceeds in FIG. 6(b) to the decision block 221 to determine whether the $\Delta$ count which has just been decremented equals zero. If it does, then operation jumps from the rate mode routine to the detent routine (block 222). If the $\Delta$ count does not equal zero, then the microprocessor 60 again loops through the Rate Mode routine by resetting and starting the Event Counter mode (block 202).

Returning now to the situation in FIG. 6(b) which occurs after the Event Counter value is read (block 212). We have already discussed what occurs if $\Delta$ is greater than n. Suppose, however, $\Delta$ is less than n but greater than m (block 226). This typically occurs when the microprocessor 60 is looking at the divide by two output (pulse train A of FIG. 4(b) from counter 102 and is seeing a relevant leading edge 142 after only two pulses have been provided by the encoder 98. This means that the $\Delta$ count should be decremented every second such leading edge 142, rather than in response to every leading edge pulse 144 as is the case when $\Delta$ is greater than n. Thus, in FIG. 6(b), the decision block 226, if true, decrements a scale of two ($\div 2$) counter (block 228). If the counter has been decremented to zero (block 229), then it is reset to two (block 230) and flow proceeds to block 217 in which the $\Delta$ count is decremented by one to indicate a unit increment of carriage movement. If the decision block 229 (which asks whether the scale of two ($\div 2$) counter has reached zero) yields a negative response, then flow bypasses blocks 217 and 218 and proceeds to block 219 which compares the desired velocity command and actual feedback velocity (the latter read out of Look Up Table 2 (block 231)) and generates an error signal (block 220).

Similarly, in FIG. 6(b), if $\Delta$ is less than m, then flow proceeds through the righthandmost downward path. That is, a scale of four ($\div 4$) counter is used (block 234) so that the microprocessor 60 must process four pulses of the undivided SERVO CLOCK pulse train in order to decrement the $\Delta$ count by 1 (blocks 235, 236, 217). In other words, if $\Delta$ is less than m, the system must loop through the rate mode routine cycle four times, thus processing four leading edges 140, in order to decrement the $\Delta$ count by one (217).

During each loop through the rate mode routine, the read Event Counter value ΔE is used to look up in the appropriate table (blocks 216, 231, 237), the corresponding actual velocity measurement. The particular look-up table used depends upon which submultiple of servo clock pulses is being employed; i.e., the table looked up depends upon whether the operation occurs in block 216, block 231, or block 237.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. In a serial impact printer including:
   a carriage;
   a print member mounted on said carriage;
   drive means mechanically coupled to said carriage for moving the carriage along a predetermined path whereby said print member is caused to move to a desired printing position along said path; and
   encoder means mechanically coupled to said carriage for generating encoder pulses at a rate representing the actual velocity of the carriage;
      an improved control means coupled to said drive means for controlling the direction and speed of movement of the carriage, said control means comprising:
      a microprocessor coupled to said second drive means for supplying control signals thereto, said microprocessor having predetermined bandwidth limitations associated with the time duration between each successive pair of selected input pulses processed by said microprocessor to determine the actual velocity of said carriage; and
      counter means responsive to said encoder pulses generated by said encoder means for producing multiple pulse train outputs, each being a different submultiple of said encoder pulses;
   said microprocessor including timing means for measuring the duration between successive selected input signals and software routine executing means for (a) selecting different ones of said multiple pulse train outputs as the selected input signals for said timing means, (b) using said timing means to determine said actual carriage velocity, and (c) generating said control signals based on said actual carriage velocity and on an associated desired command velocity during incremental motion of said carriage such that the duration between successive pulses of the selected pulse train is sufficiently long to enable said microprocessor to operate within its said bandwidth limitations while said microprocessor is processing said selected pulse train pulses and supplying said control signals to control said movement of said carriage.

2. A method of impact printing wherein a print member is mounted on a carriage, the carriage being moved along a predetermined path whereby the print member is caused to move to a desired printing position along the path with a varying carriage velocity, said method comprising the steps of:
   generating a signal representing the actual velocity of said carriage;
   controlling the direction and speed of movement of the carriage in response to a set of input data and instructions;
   supplying at least some of said input data and instructions under program control of a microprocessor, said microprocessor having a predetermined bandwidth characteristic associated therewith;
   generating a plurality of pulse train signals in response to said carriage velocity signal, the respective pulse rates of said generated pulse train signals being variable and dependent upon the actual carriage velocity; and
   using said microprocessor in accordance with a software routine for selecting different ones of said plurality of pulse train signals during incremental motion of said carriage such that at a faster carriage velocity the selected pulse train is a first one of said pulse train signals and during a slower carriage velocity the selected pulse train is a second one of said pulse train signals, said first pulse train signal being a submultiple of said second pulse train signal, the selected pulse train signal having a pulse rate that is compatible with said microprocessor bandwidth characteristic, whereby the microprocessor is enabled to operate within its bandwidth limitations.

3. In a closed loop servo system for controlling the motion of a movable member along a path from a starting position to a destination position, said member being positioned by a motor having a digital encoder mechanically coupled thereto for generating successive encoder pulses directly related to an actual increment of motion of said motor, the number of said pulses being indicative of the actual instantaneous position of said movable member, the periods of said pulses being indicative of the actual instantaneous velocity of said movable member, the improvement comprising:
   means responsive to said encoder pulses for generating multiple sets of servo pulses each set at a rate comprising a different submultiple of said encoder pulses;
   a microprocessor including means for selecting, based on a predetermined algorithm, one of said multiple sets of servo pulses;
   said microprocessor further including means for measuring the duration between successive servo pulses of said selected one set for determining the actual instantaneous velocity of said motor;
   said microprocessor further including means for counting successive servo pulses of said selected one set for determining the instantaneous position of said motor and for using said determined instantaneous position in accordance with said predetermined algorithm to select a different one of said multiple sets of servo pulses;
   said microprocessor further including means for comparing said determined ideal velocity with the determined actual instantaneous velocity of said motor and for generating an error signal rotated to the difference therebetween; and
   means for supplying said error signal to said motor to control the velocity thereof.

4. The system of claim 3 wherein said means responsive to said encoder pulses comprises digital counter means responsive to input pulses supplied to an input terminal for supplying different submultiples of said input pulses at each of a plurality of output terminals.

5. The system of claim 3 wherein said means for determining said ideal velocity includes means for accessing information from a stored look-up table based on said determined instantaneous position.

* * * * *